Patented May 25, 1937

2,081,359

UNITED STATES PATENT OFFICE 2,081,359

ANTHRAQUINONE DYESTUFFS CAPABLE OF BEING CHROMED

Georg Kränzlein, Frankfort-on-the-Main-Hochst, Hans Schlichenmaier, Kelkheim in Taunus, and Theodor Meissner, Frankfort-on-the-Main-Hochst, Germany, assignors to General Aniline Works, Inc., New York, N. Y., a corporation of Delaware No Drawing. Application December 17, 1935, Serial No. 54,938. In Germany December 18, 1934

5 Claims. (Cl. 260—59)

The present invention relates to anthraquinone dyestuffs capable of being chromed.

We have found that anthraquinone derivatives of the following general formula

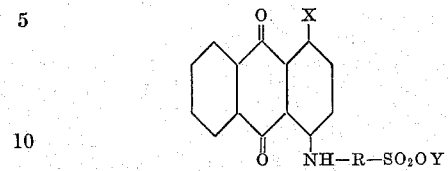

wherein X represents OH, $NH_2$, NH-alkyl or NH-aryl, Y represents H or alkali metal and R means the radical of an aromatic ortho hydroxy carboxylic acid, are dyestuffs which by treatment with an agent yielding chromium may be transformed into chromium lakes very fast to washing, fulling and to light. Moreover, the dyeings obtained with the chromium lakes or with the chrome-free dyestuffs, after-chromed on the fiber, are distinguished by a good evenness.

According to the components used there are obtained dyeings the tints of which lie generally between grey and green.

The new compounds may be made in different manners, for instance, by causing a leucoquinizarine compound to react with an aromatic ortho-hydroxy carboxylic acid or an ester thereof and sulfonating the product after its oxidation. Thus, for instance, by heating together at about 100° C. leucoquinizarine with, for instance, an amino-salicylic acid ester, dissolving the product in caustic soda solution and oxidizing it by means of air; the ester-group is saponified during the treatment and the sparingly soluble sodium compound of 1-hydroxy-4-salicylaminoanthraquinone is obtained. By acidification with a mineral acid, the 1-hydroxy-4-salicylaminoanthraquinone is obtained and may be separated from the 1,4-disalicylaminoanthraquinone which has been formed as by-product, for instance, by crystallization from glacial acetic acid. The product may then be sulfonated.

Alternatively, the dyestuffs may be produced by causing, for instance, a 1-hydroxy- or 1-amino-4-halogenanthraquinone which is free from sulfo-groups, to react with an aromatic amino-ortho-hydroxy-carboxylic acid, for instance, 3- or 5-amino-salicylic acid and sulfonating the products obtained.

Instead of a 1-amino-4-halogenanthraquinone, there may be used with the same good result, for instance, a 1-methylamino-4-halogenanthraquinone.

The same dyestuffs may be obtained by causing a 4-halogen-substituted 1-hydroxy-, 1-amino-, 1-alkylamino- or 1-arylamino-anthraquinone which is sulfonated in the anthraquinone nucleus, to react with an aromatic amino-ortho-hydroxy-carboxylic acid, splitting off the sulfo-group in the anthraquinone nucleus by heating the products with an alkaline solution of hydrosulfite or with dilute sulfuric acid and sulfonating the product obtained.

Like valuable anthraquinone dyestuffs capable of being chromed and containing sulfo-groups in definite positions may be obtained by causing a 4-halogen-substituted 1-hydroxy-, 1-amino-, 1-alkylamino-, or 1-arylamino-anthraquinone which is sulfonated in the anthraquinone nucleus, to react with a sulfonated aromatic amino-ortho-hydroxy-carboxylic acid and splitting off the sulfo-group in the anthraquinone nucleus by heating the products with an alkaline solution of hydrosulfite or with dilute sulfuric acid.

Another suitable process comprises causing a 4-halogen-substituted 1-hydroxy-, 1-amino-, 1-alkylamino- or 1-arylamino-anthraquinone which is free from sulfo-groups, to react with a sulfonated aromatic amino-ortho-hydroxycarboxylic acid whereby sulfonated salicylaminoanthraquinones which may be regarded as of unequivocal constitution are obtained in one single operation.

In the aforesaid processes it is possible to work without application of a hydrophobic organic solvent.

The following examples serve to illustrate the invention, but they are not intended to limit it thereto; the parts are by weight, unless stated otherwise; the relationship between parts by weight and parts by volume is that which exists between the kilo and the liter:—

(1) 10 parts of leuco-quinizarine are heated for 2½ hours at 100° C.–105° C. with 60 parts of 5-amino-2-hydroxy-benzoic acid methyl ester. The cold mass is pulverized, introduced into a mixture of 60 parts of caustic soda solution of 40° Bé. and 2000 parts of water and the mixture is stirred for 6 hours at 80° C.–90° C. while introducing air. The blue sodium salt is then filtered, washed until neutral by means of a sodium chloride solution of 10 per cent. strength and introduced into water which is then acidified with mineral acid; the whole is again filtered with suction and the solid matter is washed with hot water. After drying the 1-hydroxy-4-(4'-hydroxy-3'-carboxy)-phenylaminoanthraquinone is extracted by means of hot glacial acetic acid, the 1.4-disalicylaminoanthraquinone, simultaneously formed, remaining undissolved.

The 1-hydroxy-4-(4'-hydroxy - 3' - carboxy)-phenylaminoanthraquinone is a reddish - blue powder, which separates from trichlorobenzene in the form of reddish-blue needles melting at 307° C. (with frothing). It dissolves in concentrated sulfuric acid to a blue solution which turns green on addition of formaldehyde. It dissolves to a violet solution in warm glacial acetic acid, alcohol or chlorobenzene. It dissolves in pyridine, even in the cold, to a reddish-blue solution.

When this 1-hydroxy-4-(4'-hydroxy - 3' - carboxy)-phenylaminoanthraquinone is sulfonated, for instance, at 150° C.–160° C., with 20 times its weight of sulfuric acid monohydrate with addition of boric acid, there is obtained a dyestuff which dyes wool in an acid bath bluish-violet tints and yields, when after-chromed, green-grey dyeings. These are distinguished by a very good fastness to washing, fulling and to light and possess a good evenness.

(2) By substituting for the 5-amino-2-hydroxybenzoic acid methyl ester used in Example 1 the same quantity of 3-amino-2-hydroxybenzoic acid methyl ester and otherwise working in the same manner, the 1-hydroxy-4-(2'-hydroxy-3'-carboxy)-phenylaminoanthraquinone is obtained. It is a blue-grey powder which crystallizes from trichlorobenzene in the form of blue needles melting at 298° C. (with frothing). It dissolves in concentrated sulfuric acid to a reddish-blue solution which, on addition of formaldehyde, turns green-blue. The sparingly soluble sodium salt is green. It dissolves in boiling glacial acetic acid and in alcohol to a red-violet, and in boiling chlorobenzene, to a reddish-blue solution. It dissolves in pyridine even in the cold to a reddish-blue solution.

By sulfonating this 1-hydroxy-4-(2'-hydroxy-3' - carboxy) - phenylaminoanthraquinone with, for instance, 25 times its weight of sulfuric acid of 66° Bé. for 5 hours at 90° C.–100° C., a dyestuff is obtained dyeing wool in an acid bath violet tints which, when after-chromed, turn green and have very even shades of very good fastness to washing and to fulling.

(3) A mixture of 6.5 parts of 4-chloro-1-hydroxyanthraquinone, 5 parts of 5-amino-2-hydroxybenzoic acid, 12 parts of potassium acetate, 0.2 part of copper acetate, 0.2 part of copper powder and 150 parts by volume of amyl alcohol is heated to boiling in a reflux apparatus for 24 hours while stirring. After cooling, the whole is acidified with hydrochloric acid, the amyl alcohol is removed by means of steam distillation, the residue is filtered with suction while hot and the solid matter is washed with hot hydrochloric acid and then with hot water. After drying, the product obtained is boiled with benzene in order to remove any small amount of unchanged 4-chloro-1-hydroxyanthraquinone.

The product has the properties described in Example 1 and also yields, after sulfonation, grey dyestuffs capable of being chromed and having very good properties.

(4) By exchanging in Example 3 the 5-amino-2-hydroxybenzoic acid for the same quantity of 3-amino-2-hydroxybenzoic acid, the 1-hydroxy-4-(2'-hydroxy - 3' - carboxy)-phenylaminoanthraquinone is obtained which has the same properties as the product obtainable as described in Example 2. When sulfonated as prescribed in Example 2, a green dyestuff capable of being chromed and having a good levelling power and very good properties is obtained.

(5) A mixture of 6.5 parts of 1-amino-4-chloranthraquinone, 5 parts of 5-amino-2-hydroxy-benzoic acid, 12 parts of potassium acetate, 0.2 part of copper acetate, 0.2 part of copper powder and 150 parts by volume of amyl alcohol is heated to boiling in a reflux apparatus for 24 hours, while stirring. The whole is worked up as described in Example 3; the 1-amino-4-(4'-hydroxy - 3' - carboxy)-phenylaminoanthraquinone is obtained in the form of a blue powder melting at 267° C. (with frothing). It dissolves in concentrated sulfuric acid to a violet-red solution which, on addition of formaldehyde turns green. By heating it in caustic soda solution, a sparingly soluble green-blue sodium salt is obtained which dissolves to a blue solution in hot sodium carbonate solution, and separates soon in the form of blue flakes.

It dissolves in hot glacial acetic acid, alcohol and chlorobenzene to a reddish-blue solution; it dissolves in pyridine even in the cold to a blue solution.

By sulfonating the 1-amino-4-(4'-hydroxy-3'-carboxy)-phenylaminoanthraquinone, for instance, by heating it at 130° C.–140° C. for 4 hours in 20 times its weight of sulfuric acid monohydrate, a dyestuff is obtained which dyes wool in an acid bath blue tints. When after-chromed, a grey tint of good properties of fastness is obtained. The tint has a somewhat more reddish hue than the grey tint obtainable as described in Example 1.

(6) By substituting in Example 5 for the 5-amino-2-hydroxybenzoic acid the 3-amino-2-hydroxybenzoic acid and working otherwise in the same manner, the 1-amino-4-(2'-hydroxy-3'-carboxy)-phenylaminoanthraquinone is obtained which is a blue-grey powder, melting at 250° C. (with frothing). It dissolves in concentrated sulfuric acid to a red-brown solution which turns green-blue on addition of formaldehyde. It dissolves in boiling glacial acetic acid and in alcohol to a blue solution, in cold pyridine to a green-blue solution and in hot pyridine to a reddish-blue solution.

By sulfonating the 1-amino-4-(2'-hydroxy-3'-carboxy)-phenylaminoanthraquinone, for instance, by heating it at 80° C.–90° C. for 4 hours in 20 times its weight of sulfuric acid monohydrate, a dyestuff is obtained which dyes wool in an acid bath a covered greenish-blue tint, which, when after-chromed, turns a green of good properties of fasteness.

(7) A mixture of 15 parts of 1-methylamino-4-bromanthraquinone, 10 parts of 5-amino-2-hydoxybenzoic acid, 25 parts of potassium acetate, 0.5 part of copper acetate, 0.5 part of copper powder and 300 parts by volume of amyl alcohol is boiled for 24 hours. The whole is worked up as described in Example 3. The 1-methyl-amino-4-(4'-hydroxy-3'-carboxy)-phenylaminoanthraquinone crystallizes from trichlorobenzene in the form of blue needles melting at 242° C.–243° C. (with frothing). It dissolves in concentrated sulfuric acid to a dichroic blue-red solution which turns green on addition of formaldehyde. It dissolves in warm dilute caustic soda solution to a blue-green solution from which a blue-green sodium salt separates, whereas it dissolves in hot sodium carbonate solution to a blue solution. It dissolves to a blue solution in boiling glacial acetic acid, alcohol, chlorobenzene and cold pyridine.

By sulfonating the 1-methylamino-4-(4'-hydroxy-3'-carboxy)-phenylaminoanthraquinone, for instance, by heating it for 8 hours at 120° C.–130° C. in 20 times its weight of sulfuric acid monohydrate, a dyestuff is obtained which dyes wool in an acid bath a blue tint, which when chromed, turns a grey of good properties of fastness.

By substituting in this example for the 1-methylamino-4-bromanthraquinone the 1-ethylamino-4-bromanthraquinone, a similar dyestuff is obtained.

(8) By substituting in Example 7 for the 5-amino-2-hydroxybenzoic acid the 3-amino-2-hydroxybenzoic acid and working otherwise in the same manner, the 1-methylamino-4-(2'-hydroxy-3'-carboxy)-phenylaminoanthraquinone is obtained in the form of a black-green powder melting at 276° C. (with frothing). It dissolves in concentrated sulfuric acid to a violet-brown solution which turns green on addition of formaldehyde. In hot dilute caustic soda solution or sodium carbonate solution it dissolves to a blue-green solution from which a sparingly soluble blue-green sodium salt separates. It dissolves in boiling alcohol to a greenish-blue, in boiling glacial acetic acid and chlorobenzene to a blue-grey solution. It dissolves in cold pyridine to a greenish-blue solution.

By sulfonating it, for instance, by stirring for 4 hours at 80° C.–90° C. in 20 times its weight of sulfuric acid monohydrate, a blue dyestuff is obtained which dyes wool in an acid bath blue-green tints. When after-chromed the tints turn green, having good properties of fastness.

(9) 20 parts of 5-amino-2-hydroxybenzoic acid are dissolved in a solution of 150 parts by volume of water and 10 parts of sodium carbonate; 20 parts of sodium bicarbonate, 3 parts of cuprous chloride and a paste of 20 parts of sodium 1-hydroxy-4-bromo-anthraquinone-2-sulfonate in 100 parts of water is then added. The whole is heated in the course of 10 hours from 70° C.–98° C. The frothing of the mass has then ceased. The whole is cooled to room temperature, the blue suspension is diluted with some sodium chloride solution and filtered with suction. The solid matter is made into a paste with water, rendered alkaline by means of caustic soda solution and a sodium chloride solution is added until the product has separated in the form of flakes, which, again, are filtered with suction and washed with a sodium chloride solution of 5 per cent. strength.

27 parts of the 1-hydroxy-4-(4'-hydroxy-3'-carboxy)-phenylaminoanthraquinone-2-sulfonic acid thus obtained, in the form of its sodium salt, are dissolved by heating them in 2000 parts of water and 18 parts of sodium carbonate whereby the solution assumes a turbid violet coloration. After cooling to room temperature in the course of a quarter of an hour, 14 parts of pulverized sodium hydrosulfite are added and the whole is stirred at room temperature for about 1 hour until the color has completely turned brown. 50 parts of caustic soda solution of 40° Bé. are then added and the whole is heated for about 3 hours at 60° C.–70° C. whereby a blue sodium salt separates. The whole is filtered with suction and the solid matter is washed with a sodium chloride solution of 10 per cent. strength. The solid matter is made into a paste with water and then acidified by addition of mineral acid, the whole is filtered with suction and the solid matter is washed with hot water. The 1-hydroxy-4-(4'-hydroxy-3'-carboxy)-phenylaminoanthraquinone thus obtained is a reddish-blue powder which crystallizes from trichlorobenzene in the form of reddish-blue needles melting at 307° C. (with frothing). It dissolves in concentrated sulfuric acid to a blue solution which turns green on addition of formaldehyde. It has the properties of fastness described in Example 1 and, on sulfonation, yields likewise a dyestuff which dyes wool in an acid bath bluish-violet tints and, when after-chromed, yields grey dyeings of good fastness.

(10) By substituting in Example 9 for the 5-amino-2-hydroxybenzoic acid the 3-amino-2-hydroxybenzoic acid and working in the same manner, the 1-hydroxy-4-(2'-hydroxy-3' - carboxy)-phenylaminoanthraquinone is obtained which crystallizes from trichlorobenzene in the form of blue needles melting at 298° C. (with frothing) and which dissolves in concentrated sulfuric acid to a reddish blue solution becoming green-blue on addition of formaldehyde. It is identical with the product obtainable according to Example 2, and, likewise, yields on sulfonation a dyestuff dyeing wool from an acid bath violet tints which, when chromed, turn a green of good fastness to washing, fulling and light.

(11) 20 parts of 5-amino-2-hydroxybenzoic acid are made into a paste with 20 parts of sodium 1-amino-4-bromanthraquinone-2-sulfonate and 200 parts of water and, after addition of 25 parts of sodium bicarbonate, 3 parts of sodium carbonate and 1 part of cuprous chloride, the whole is stirred for about 10 hours at 70° C.–75° C. until no unchanged sodium-aminobromanthraquinone sulfonate can be detected with the microscope. The mass is then diluted with 3 times its weight of water and acidified with dilute hydrochloric acid. The precipitate is filtered with suction, washed with 2N-hydrochloric acid, the residue remaining on the filter is dissolved in hot 2N-caustic soda solution and, by addition of a saturated sodium chloride solution, the 1-amino-4-(4'-hydroxy-3'-carboxy)-phenylaminoanthraquinone-2-sulfonic acid is salted out in the form of a blue sodium salt. It is filtered with suction and washed until neutral with a sodium chloride solution of about 15 per cent. strength. 20 parts of this product are dissolved together with 13 parts of sodium carbonate in 1000 parts of hot water, the solution is cooled to 20° C. and in the course of a quarter of an hour 9 parts of pulverized sodium hydrosulfite are added. The whole is stirred for about half an hour until a brown suspension has been formed, 30 parts of caustic soda solution of 40° Bé. are added and the mass is heated for 1 hour at 95° C.–100° C. It is filtered with suction while hot and the solid matter is washed with cold water, and suspended in water while stirring; the suspension is acidified with hydrochloric acid, boiled for a short time, filtered with suction and the solid matter is washed until neutral with hot water. After drying, the 1-amino-4-(4'-hydroxy-3'-carboxy)-phenylaminoanthraquinone is obtained which crystallizes from trichlorobenzene in the form of blue needles melting at 267° C. (with frothing). It dissolves in concentrated sulfuric acid to a violet-red solution becoming green on addition of formaldehyde. It has the same properties as the product obtainable as described in Example 5 and yields, by sulfonation, a dyestuff which dyes wool in an acid bath blue tints. By after-chroming a grey of good properties is obtained.

(12) By causing in the manner described in

Example 11 3-amino-2-hydroxybenzoic acid to react with sodium 1-amino-4-bromanthraquinone-2-sulfonate and splitting off the sulfo-group from the anthraquinone nucleus, the 1-amino-4-(2'-hydroxy-3'-carboxy)-phenylaminoanthraquinone is obtained in the form of a blue-grey powder, melting at 257° C. It is identical with the product obtainable as described in Example 6 and, likewise, yields, on sulfonation, a dyestuff dyeing wool in an acid bath covered greenish-blue tints which when after-chromed become a green of good properties of fastness.

(13) 30 parts of 5-amino-2-hydroxy-3-sulfobenzoic acid and 30 parts of 1-hydroxy-4-bromanthraquinone-2-sulfonic acid are stirred in 400 parts of water with 15 parts of sodium carbonate and, after the frothing has ceased, 25 parts of sodium bicarbonate and 5 parts of cuprous chloride are added. The whole is heated and the temperature is raised in the course of 6 hours from 70° C. to 98° C. until frothing can no longer be detected. After cooling to room temperature the blue-green precipitate is filtered with suction. The solid matter is made into a paste with 1250 parts of water and there are added 150 parts by volume of caustic soda solution of 40° Bé. and such a quantity of a saturated sodium chloride solution as is necessary to precipitate flakes from the solution. The flakes are filtered with suction and washed with a saturated sodium chloride solution until neutral. The 1-hydroxy-4-(4'-hydroxy-3'-carboxy-5'-sulfo)-phenylaminoanthraquinone-2-sulfonic acid, obtained in the form of its sodium salt, is made into a paste of 13 per cent. strength; 100 parts thereof are stirred into 1000 parts of water, the mixture is heated, after addition of 10 parts of sodium carbonate and, after cooling to ordinary temperature, 6 parts of pulverized sodium hydrosulfite are added in the course of a quarter of an hour. The whole is stirred for about three quarters of an hour to one hour until the color of the solution has changed to brown. 20 parts of caustic soda solution of 40° Bé. are added and the whole is heated for 3 hours at 60° C.–65° C. The whole is filtered by suction, while hot, the solid matter is washed with cold water, dissolved in 500 parts by volume of water and 10 parts by volume of glacial acetic acid, the solution is filtered and the dyestuff is salted out by addition of a sodium chloride solution and worked up as usual. The 1-hydroxy-4-(4'-hydroxy-3'-carboxy-5'-sulfo)-phenylaminoanthraquinone is thus obtained in the form of a blue powder, dissolving in acidified water to a violet solution which dyes wool a violet-blue tint that by chroming becomes a grey-green of good properties of fastness.

(14) By substituting in Example 13 for the 5-amino-2-hydroxy-3-sulfobenzoic acid the 3-amino-2-hydroxy-5-sulfobenzoic acid and splitting off in the same manner the sulfo-group contained in the anthraquinone nucleus, the 1-hydroxy-4-(2'-hydroxy-3'-carboxy-5'-sulfo)-phenylaminoanthraquinone is finally obtained; this dissolves in acidified water to a reddish-blue solution which dyes wool a violet-blue tint becoming by after-chroming even green shades distinguished by a good fastness to washing, fulling and light.

(15) 20 parts of 5-amino-2-hydroxy-3-sulfobenzoic acid are dissolved at about 50° C. in 100 parts of water by addition of 10 parts of sodium carbonate; 20 parts of sodium 1-amino-4-bromanthraquinone-2-sulfonate, made into a paste with 60 parts of water, are added and, after addition of 10 parts of sodium bicarbonate and 2 parts of cuprous chloride, the whole is stirred for 7 hours, while raising the temperature gradually from 70° C.–75° C. to 95° C., until the frothing of the mass has ceased and sodium aminobromanthraquinone-2-sulfonate can no longer be detected by the microscope. After addition of 200 parts by volume of saturated sodium chloride solution, the blue-green product is filtered with suction; it is stirred with a sodium chloride solution of 15 per cent. strength, again filtered with suction and suspended in water. Concentrated hydrochloric acid is added to the suspension whereupon the product separates in the form of a red-brown precipitate. 25 parts of the filtered product are made into a paste of 10 per cent. strength and are stirred with 1200 parts of water, whereby the brown color is changed to blue; such a quantity of sodium carbonate is added that a neutral reaction is just attained and the whole is stirred until dissolution occurs. Then 16 parts of sodium carbonate are added, followed by 12 parts of pulverized sodium hydrosulfite in the course of a quarter of an hour, while stirring, whereby after a short stirring, the color turns brown. Stirring is continued for 2 hours, 35 parts of a caustic soda solution of 40° Bé. are added and the whole is heated for 4 hours at 60° C. Thereupon, a saturated sodium chloride solution is added and the product which separates in the form of a blue sodium salt is filtered with suction. It is dissolved in hot water while adding a small quantity of glacial acetic acid, the solution is filtered with suction and the 1-amino-4-(4'-hydroxy-3'-carboxy-5'-sulfo)-phenylaminoanthraquinone is salted out from the filtrate in the form of its sodium salt by adding a sodium chloride solution. It dissolves in acidified water to a reddish-blue solution which dyes wool a blue tint which when after-chromed becomes a grey of good properties of fastness.

(16) In the same manner as stated in Example 15 20 parts of 3-amino-2-hydroxy-5-sulfobenzoic acid are caused to react with 20 parts of sodium-1-amino-4-bromo-anthraquinone-2-sulfonate. After addition of sodium chloride solution, the 1-amino-4-(2'-hydroxy-3'-carboxy-5'-sulfo)-phenylaminoanthraquinone-2-sulfonic acid, separates in the form of a green sodium salt and is filtered with suction, washed with a sodium chloride solution of 15 per cent. strength and made into an aqueous suspension; concentrated hydrochloric acid is added, whereby a currant colored precipitate is formed. 20 parts of this product are made into a paste of 10 per cent. strength and stirred with 800 parts of water and such a quantity of sodium carbonate that the whole dissolves and the reaction becomes neutral. 12 parts of sodium carbonate and 8 parts of pulverized sodium hydrosulfite are then added in the aforesaid manner and, after splitting off of the sulfo-group, 25 parts of caustic soda solution of 40° Bé. are added, whereupon the whole is heated for 4 hours at 60° C. Some sodium chloride solution is now added, the whole is filtered with suction, the solid matter is dissolved in a mixture of hot water and some glacial acetic acid, the solution is filtered and the product is salted out from the filtrate by addition of sodium chloride solution. The 1-amino-4-(2'-hydroxy-3'-carboxy-5'-sulfo)-phenylaminoanthraquinone is obtained in the form of its sodium salt; this dissolves in acidified water to a blue solution which dyes wool a blue tint becoming a green-blue of good properties of fastness when after-chromed.

(17) 20 parts of 4-chloro-1-hydroxyanthraquinone and 40 parts of 5-amino-2-hydroxy-3-sulfobenzoic acid are together heated at 150° C. under pressure for 20 hours in a closed vessel with 100 parts of potassium acetate, 2 parts of copper acetate, 1 part of copper powder and 500 parts of water. The blue mass is then filtered with suction and the solid matter is washed with a sodium chloride solution. It is dissolved in hot water with addition of some glacial acetic acid, the solution is filtered and the 1-hydroxy-4-(4'-hydroxy-3'-carboxy-5'-sulfo)-phenylaminoanthraquinone is obtained from the filtrate in the form of its sodium salt by addition of sodium chloride solution; it is filtered with suction and dried. By treating the dried dyestuff with boiling chlorobenzene, any small amounts of 4-chloro-1-hydroxyanthraquinone may be dissolved and removed. The dyestuff dissolves in acidified water to a violet solution which dyes wool bluish-violet tints. By after-chroming, the dyeings assume a grey color of good properties of fastness.

(18) By substituting in Example 17 for the 5-amino-2-hydroxy-3-sulfobenzoic acid the same quantity of 3-amino-2-hydroxy-5-sulfobenzoic acid and working otherwise in the same manner, the 1-hydroxy-4-(2'-hydroxy-3'-carboxy-5'-sulfo)-phenylaminoanthraquinone is obtained; this dissolves in acidified water to a reddish-blue solution. The dyestuff dyes wool a blue tint which, when after-chromed, becomes a green of good properties of fastness.

(19) 20 parts of 1-methylamino-4-bromanthraquinone, 40 parts of 5-amino-2-hydroxy-3-sulfobenzoic acid, 100 parts of potassium acetate, 2 parts of copper acetate and 1 part of copper powder are heated together at 100° C. for 20 hours in a closed vessel with 300 parts by volume of alcohol and 300 parts of water. The product, which has separated in the form of a blue-grey sodium salt, is filtered with suction, dissolved in hot water while adding acetic acid, the violet solution is filtered and the 1-methylamino-4-(4'-hydroxy-3'-carboxy-5'-sulfo)-phenylamino anthraquinone is salted out by adding a sodium chloride solution. The dyestuff dyes wool in an acid bath a blue tint which, by after-chroming becomes a grey of good properties of fastness.

(20) 35 parts of para-aminobenzoyl-1-amino-2-hydroxy-5-sulfobenzene-3-carboxylic acid of the formula

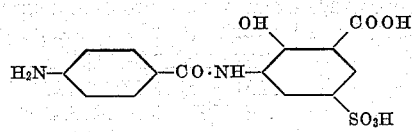

are dissolved at 50° C. in 70 parts of water with addition of 15 parts of sodium carbonate, 20 parts of sodium 1-hydroxy-4-bromanthraquinone-2-sulfonate are made into a paste with 80 parts of water and added thereto, and, on addition of 10 parts of sodium bicarbonate and 0.5 part of cuprous chloride, the whole is stirred for 20 hours while gradually raising the temperature from 60° C.-65° C. to 95° C. The violet melt is then diluted with about 1000 parts of water, acidified with hydrochloric acid, filtered with suction and washed with normal hydrochloric acid until the solution used for washing is no longer yellow and thus freed from a small amount of hydroxybromanthraquinone sulfonic acid not consumed.

In order to split off the sulfo-group contained in the anthraquinone nucleus 230 parts of a paste of 10 per cent. strength of this dyestuff are dissolved in 1500 parts of water with addition of a sodium carbonate solution until neutral, 12 parts of sodium carbonate are then added and 10 parts of pulverized sodium hydrosulfite are stirred in within half an hour at ordinary temperature. Stirring is continued until the whole has assumed a brown color; thereupon, 25 parts of a caustic soda solution of 40° Bé. are added and the whole is stirred for 3 hours at 50° C.-60° C., a pure blue solution being formed.

The sodium salt of the dyestuff is salted out, filtered with suction, washed neutral, first with water, then with a sodium chloride solution of 6 per cent. strength, and dried.

The dyestuff thus obtained has the following constitution

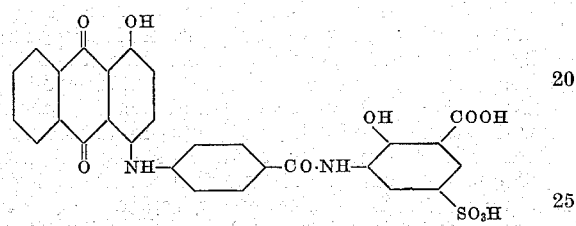

It dissolves in acidified water to a violet solution and dyes wool from this bath violet tints becoming, when after-chromed, a grey-blue of good fastness to washing, fulling and potting.

(21) 13 parts of 4-amino-3'-carboxy-4'-hydroxy-5'-methyldiphenylmethane are dissolved at 50° C. in 40 parts of water with addition of 7 parts of sodium carbonate. Thereupon, 12 parts of sodium 1-hydroxy-4-bromanthraquinone-2-sulfonate, made into a paste with 50 parts of water, are added as well as 6 parts of sodium bicarbonate and 0.5 part of cuprous chloride.

The whole is then stirred for 24 hours while gradually raising the temperature from 60° C.-65° C. to 95° C. After cooling and diluting with water, the blue melt is acidified, and the dyestuff which thus separates in the form of blue needles, is filtered with suction and thoroughly washed with normal hydrochloric acid. The dyestuff dissolves in concentrated sulfuric acid to a yellow-brown solution which turns green on addition of formaldehyde. 170 parts of a paste of 10 per cent. strength of this dyestuff are stirred with 700 parts of water in order to split off the sulfo-group contained in the anthraquinone nucleus and rendered neutral by means of a sodium carbonate solution. After addition of 11 parts of sodium carbonate, 9 parts of pulverized sodium hydrosulfite are introduced within a quarter of an hour and the whole is stirred until the color has changed to brown. Thereupon, 25 parts of a caustic soda solution of 40° Bé. are added, the whole is heated for 4 hours at 50° C.-60° C., the blue solution is acidified with hydrochloric acid, filtered with suction, and the dyestuff washed neutral with water and dried. By boiling out with nitrobenzene and removing the solvent by steam-distillation, the 1-hydroxy-4-amino-4'-hydroxy-3'-carboxy-5'-methyldiphenylmethane-anthraquinone of the constitution

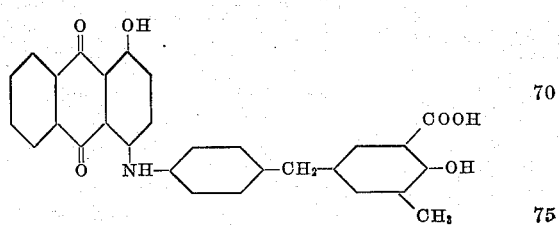

is obtained, melting at 248° C. (with frothing); it dissolves in concentrated sulfuric acid to a green solution and yields with caustic soda solution a greenish-blue sodium salt.

By sulfonating this body, for example, by heating for 6 hours at 70° C.–80° C. with 30 times its weight of fuming sulfuric acid containing 12% of sulfuric anhydride, a dyestuff is obtained which dyes wool from an acid bath bluish-violet tints. By after-chroming, the dyeings assume a grey-blue color of good properties of fastness.

(22) 20 parts of 1-dichloranilido-4-chlor-anthraquinone, obtainable by chlorination of 1-anilido-anthraquinone in boiling carbon tetrachloride, are boiled with 12 parts of 2-hydroxy-3-amino-benzoic acid with addition of 8 parts of potassium acetate, 1 part of copper acetate and 0.2 part of copper powder for 8 hours in 250 parts by volume of amyl alcohol, whereby the color changes from red to deep green. After cooling, the well crystallized reaction product is filtered with suction and the inorganic impurities are removed by water, the organic ones by toluene. The product obtained, in which the chlorine atom situated in the 4-position is replaced by the amino-salicylic acid radical, is green; it may be sulfonated at 200° C., with addition of sodium sulfate in 30 times its weight of sulfuric acid monohydrate and yields an acid wool dyestuff, which dyes the animal fiber green tints which, when chromed, become a greenish-grey of excellent fastness properties.

We claim:

1. The compounds of the general formula:

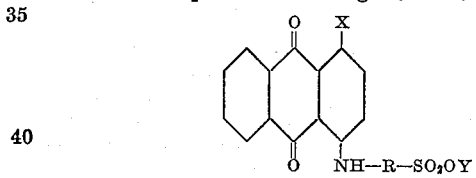

wherein X is a member of the group consisting of hydroxy, amino, arylamino and alkylamino, Y is a member of the group consisting of H and the alkali metals, and R means the radical of an aromatic ortho-hydroxy-carboxylic acid.

2. The compounds of the general formula:

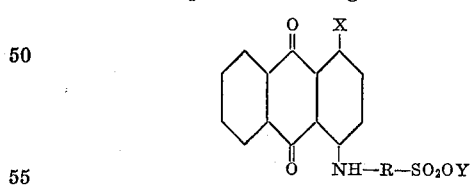

wherein X is a member of the group consisting of hydroxy, amino, arylamino and alkylamino, Y is a member of the group consisting of H and the alkali metals, and R means an aromatic radical containing a benzene nucleus with a carboxy and a hydroxy group in ortho positions to each other.

3. The compound of the formula:

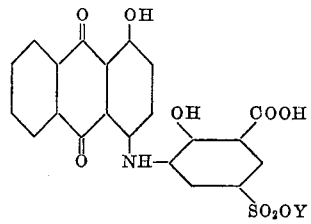

wherein Y is a member of the group consisting of H and the alkali metals, dissolving in acidified water to a reddish-blue solution which dyes wool a violet-blue tint becoming by after-chroming even green shades distinguished by a good fastness to washing, fulling and light.

4. The compound of the formula:

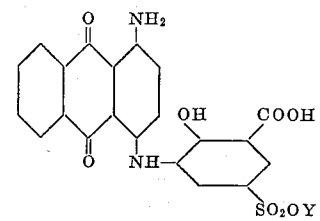

wherein Y is a member of the group consisting of H and the alkali metals, dissolving in acidified water to a blue solution which dyes wool a blue tint becoming a green-blue of good properties of fastness when after-chromed.

5. The compound of the formula:

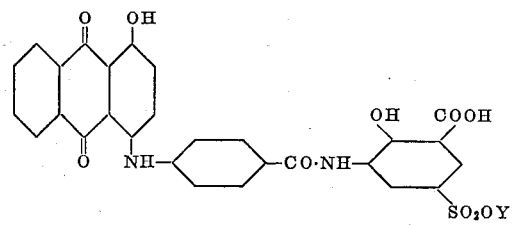

wherein Y is a member of the group consisting of H and the alkali metals, dissolving in acidified water to a violet solution which dyes wool violet tints becoming, when after-chromed, a grey-blue of good fastness to washing, fulling and potting.

GEORG KRÄNZLEIN.
HANS SCHLICHENMAIER.
THEODOR MEISSNER.